Patented May 7, 1935

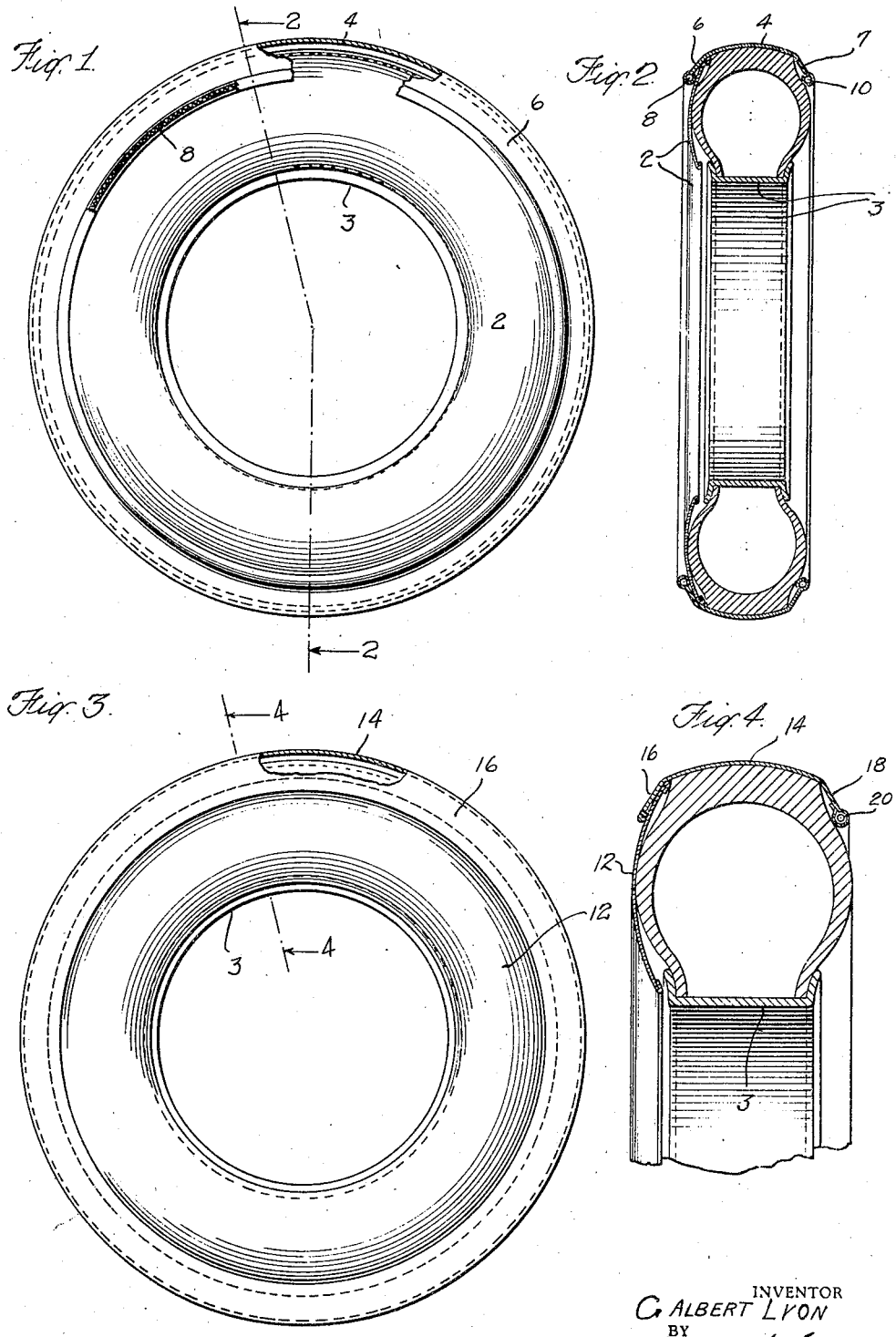

2,000,290

UNITED STATES PATENT OFFICE 2,000,290

COVER FOR SPARE TIRES OF AUTOMOBILES

George Albert Lyon, Allenhurst, N. J., assignor to Lyon Incorporated, Asbury Park, N. J., a corporation of Delaware Application April 9, 1930, Serial No. 442,749

2 Claims. (Cl. 150—54)

This invention relates to covers for the spare tires of automobiles.

The principal objects of the invention are to produce a cover for spare tires, which is highly attractive in appearance, which may be quickly and easily applied to and removed from the tire, which will furnish a satisfactory protection for the tire, and which is simple in construction and may be manufactured at a relatively low cost.

With these and other objects in view the invention consists in a tire cover embodying the novel and improved features and constructions of parts hereinafter described and particularly pointed out in the claims the advantages of which will be readily understood and appreciated by those skilled in the art.

The invention will be clearly understood from the accompanying drawing illustrating the invention in its preferred form and the following detailed description of the constructions therein shown.

In the drawing:

Fig. 1 is a view in side elevation, partly broken away and partly in section, illustrating a tire cover embodying certain features of the invention applied to a tire;

Fig. 2 is a sectional view taken substantially on the line 2—2 of Fig. 1;

Fig. 3 is a view in side elevation, partly broken away and partly in section, illustrating a tire cover of somewhat different form applied to a tire; and Fig. 4 is a sectional view taken substantially on the line 4—4 of Fig. 3.

In the drawing, the cover is illustrated as applied to a tire 1 supported on a demountable rim 3. In the form of the invention illustrated in Figs. 1 and 2, the tire cover comprises a cover member 2 constructed to cover one side of a tire, and a cover member 4 constructed to extend about and cover the peripheral portion of the tire. The cover member 2 is formed of relatively thin resilient sheet material such as sheet metal and may be made in the form of a ring as shown in the drawing, or in the form of a plate constructed to extend from the axis of the tire and rim to or substantially to the periphery of the tire. This cover member is constructed to conform to a certain degree to the convex curvature of the side wall of a tire, and to this end is made concavo-convex in cross-section. This cover member is applied to the tire with the concave or recessed side adjacent the side wall of the tire, the convex side wall of the tire fitting into the concavity in said section, as shown in Fig. 2. This member when made in ring form is preferably constructed as a continuous ring.

The member 4 of the tire cover which is constructed to extend about the periphery of a tire is formed of flexible sheet material and is preferably made of textile fabric coated on one or both sides with a coating material which will give the coated fabric a glazed finished surface. The cover member 4 is made in the form of a continuous ring constructed to extend about the periphery of the tire. The width of the section 4 is such that it extends transversely across the tread surface of the tire and its marginal portions project for some distance beyond said tread surface so that said marginal portions may be drawn inwardly toward the axis of the tire respectively over the outer margin of the section 2 on one side of the tire and over the side surface of the tire on the other side thereof. The marginal portions of the member 4 are yieldingly held in contracted position as shown in Fig. 2 by coiled springs 8 and 10 secured to said marginal portions at the edges thereof. These coiled springs are preferably attached to the margins of the member 4 by folding the flexible material over the springs and stitching the same in position. The member 4 is held in contracted relation to the tire with the margin 6 thereof overlapping the outer margin of the side cover member 2 and with the margin 7 extending inwardly over the side of the tire by the action of the coiled springs 8 and 10. The member 4 therefore is held by the springs in gripping relation to the tire and securely holds itself and the member 2 in position on the tire.

In applying the tire cover to a tire the tire and rim are preferably placed in a horizontal position on the ground or upon any other suitable support. The side cover member 2 is then laid upon the upper side of the tire in substantially the position shown in Fig. 2 with relation to the tire. The peripheral cover member 4 is then applied to the tire. In applying this member to the tire the margin 7 thereof is expanded against the action of the coiled spring 10, and the cover member is then drawn over the tire until the margin 6 which is held contracted by the action of the spring 8 engages the marginal portion of the cover member 2. In this position, the marginal portion 7 of the cover member 4 projects beyond the tread portion of the tire, and the cover member 4 is then released allowing the coiled spring 10 to contract said marginal portion 7 into substantially the position shown in Fig. 2.

The construction shown in Figs. 3 and 4 comprises a side cover member 12 having substantially the same construction as the cover member 2 shown in Figs. 1 and 2 and a peripheral cover member 14 having substantially the same construction as the peripheral cover member 4 shown in Figs. 1 and 2 except as hereinafter described. The cover member 14 consists of a ring of flexible sheet material formed to extend about the peripheral portion of a tire and having a width such that when applied to the tire the marginal portion 16 of said member projects for some distance beyond the tread portion of the tire and overlaps the outer margin of the side cover member 12 on the outside thereof, and that the marginal portion 18 projects for some distance beyond the tread portion of the tire so that it may be drawn inwardly over the side surface of the tire as shown in Fig. 4. The cover member 14 differs from the cover member 4, however, in that the marginal portion 16 is substantially inexpansible and is so shaped that when the cover member is applied to a tire, the said marginal portion extends inwardly toward the axis of the tire, the said marginal portion being so constructed that the annular length of its edge is substantially less than the length of the periphery of the side cover member 12.

The tire cover shown in Figs. 3 and 4 is applied to the tire in substantially the same manner as the tire cover shown in Figs. 1 and 2. In applying the tire cover shown in Figs. 3 and 4 to the tire, after the side cover member 12 is placed in position, the marginal portion 18 of the cover member 14 is expanded and said cover member is drawn over the tire until the inexpansible margin 16 engages the outer margin of the member 12. The cover member 14 is then released and the spring 20 then contracts the marginal portion 18 into the position shown in Fig. 4 thereby causing the member 14 to grip the tire and hold itself and the cover member 12 in position.

In each of the constructions shown the tire cover is so constructed and formed that it has a very pleasing and attractive appearance, and the cover may be applied to and removed from the tire by simple, easy and convenient manual operation. The tire cover is simple in construction and is capable of manufacture in large quantities at a relatively low cost. The cover also furnishes a satisfactory protection for the tire to prevent the access of dust, dirt and water thereto.

It is to be understood that the invention is not limited to the particular construction and arrangement of parts of the illustrated embodiments of the invention, but that the invention may be embodied in other forms within the scope of the claims.

Having explained the nature and object of the invention and having specifically described certain constructions embodying the invention in its preferred forms, what is claimed is:

1. A tire cover for spare tires comprising a side part to substantially cover the outer side wall of the tire and sufficiently rigid to sustain itself against collapsing and a tread covering part made from relatively flexible sheet material such as fabric sheet extending from said side part across the tread of the tire and provided with expansible and contractible means whereby the inner circumferential side of said tread part is brought into holding engagement with the tire said tread covering part comprising an endless continuous ring of curved channeled cross-section which defines a shallow annular pocket open on the inner side of the ring to accommodate the tread of the tire after it is stretched over the outer periphery of the tire in cooperation with said side part and the inner side of the tire tread.

2. A tire cover for spare tires comprising a side part to substantially cover the outer side wall of the tire and sufficiently rigid to sustain itself against collapsing and a tread covering part made from relatively flexible sheet material such as fabric sheet extending from said side part across the tread of the tire and provided with expansible and contractible means whereby the inner circumferential side of said tread part is brought into holding engagement with the tire, said tread covering part comprising an endless continuous ring of curved channeled cross-section which defines a shallow annular pocket open on the inner side of the ring to accommodate the tread of the tire after it is stretched over the outer periphery of the tire in cooperation with said side part and the inner side of the tire tread, and a spring element or the like in the rear edge of said ring for aiding in retaining it in said position.

GEORGE ALBERT LYON.